US006479169B1

United States Patent
Chang et al.

(10) Patent No.: US 6,479,169 B1
(45) Date of Patent: Nov. 12, 2002

(54) LOW NOISE MAGNETIC RECORDING MEDIA HAVING A INTERLAYER FILM

(75) Inventors: Jack Chang, Hsinchu (TW); Gina Liang, Hsinchu (TW); Wu-Shun Wang, Hsinchu (TW); James W. Liang, Hsinchu (TW); Hung-Chang W. Huang, Taoyuan (TW)

(73) Assignee: Trace Storage Technology Corp., Hsingchu (TW)

( * ) Notice: Subject to any disclaimer, the term of this patent is extended or adjusted under 35 U.S.C. 154(b) by 0 days.

(21) Appl. No.: 09/527,379

(22) Filed: Mar. 16, 2000

(51) Int. Cl.$^7$ .................................................. G11B 5/64
(52) U.S. Cl. ...................... 428/667; 428/332; 428/678; 428/336; 428/694 TS; 428/212
(58) Field of Search ................................. 428/332, 611, 428/660, 664, 666, 667, 668, 900, 694 TS, 678, 336, 212

(56) References Cited

U.S. PATENT DOCUMENTS

| | | | |
|---|---|---|---|
| 5,147,732 A | * 9/1992 | Shiroishi et al. | 428/668 |
| 5,468,305 A | * 11/1995 | Uchida et al. | 148/120 |
| 5,516,547 A | 5/1996 | Shimizu et al. | |
| 5,605,733 A | * 2/1997 | Ishikawa et al. | 428/65.3 |
| 5,693,426 A | 12/1997 | Lee et al. | |
| 5,789,088 A | * 8/1998 | Nakai et al. | 428/611 |
| 5,922,442 A | * 7/1999 | Lal et al. | 428/216 |
| 6,037,069 A | * 3/2000 | Ataka et al. | 428/694 TS |
| 6,143,388 A | * 11/2000 | Bian et al. | 428/65.3 |

FOREIGN PATENT DOCUMENTS

JP 60-233810 A * 11/1985

OTHER PUBLICATIONS

"Effect of COCR Interlayer on Longitudinal Recording," S. Ohkijima, M. Oka, H. Murayama, IEEE Transactions on Magnetics, vol. 33, No. 5, Sep. 1997, pp. 2944–2946.
JPO Abstract Translation of Tokkyo Kokai 60–233810 A (ClippedImage No. JP360233810A).*

* cited by examiner

Primary Examiner—Stevan A. Resan
Assistant Examiner—Kevin M. Bernatz

(57) ABSTRACT

A magnetic recording medium using a nonmagnetic interlayer in between a Cr-base underlayer and a Co magnetic layer is disclosed. The nonmagnetic interlayer comprises $Co_{1-\alpha-\beta-\gamma-\zeta}Cr_\alpha X_\beta Y_\gamma Z_\zeta$. X is a material selected from Ni or Fe so as to substitute a portion of Cr composition. Y is a material selected from materials which can form a solid solution with at least one of list materials consisting of Ni, Fe, Co, and Cr. The Y materials added in the interlayer is to adjust the lattice mismatch of interface between the interlayer and the underlayer to a magnitude so that the interlayer formed on the underlayer at least is a texture layer, an epitaxial layer is best preferred. However, Z is a material which is insoluble with any of above list materials, Cr, Co, X, and Y in a solid state so as to form precipitates, thereby inhibiting the grain growth. In a preferred embodiment, the $\alpha$, $\beta$, $\gamma$, and $\zeta$ are about 25–41%, 0.1–5%, 0.1–5%, and 0.1–5%, respectively. The interlayer thickness is of between about 0.5–20 nm.

12 Claims, 2 Drawing Sheets

LOW NOISE MAGNETIC RECORDING MEDIA HAVING A INTERLAYER FILM

BACKGROUND OF THE INVENTION

1. Field of the Invention

The present invention relates to a magnetic recording media for disk and, more particularly, to using an non-magnetic interlayer between the Cr containing underlayer and Co containing magnetic material to improve magnetic properties.

2. Description of the Prior Art

With the advent of storage media technique rapidly prompt, the most prominent features are to increase the recording density in magnetic disks.

There are several basic characteristics, such as the half amplitude pulse width (PW50), the coercivity (Hc), and the signal/noise, (S/N) ratio to assess the performance of the magnetic recording disk. Half amplitude pulse width (PW50) is ideal to be narrower so that adjacent bit interference with one another will not occur, and hence increases the packing density in a given area. A thicker magnetic film is believed to reduce the read jitter noise. Writer jitter noise, however, is known to be due to large magnetic domains having a high exchange interaction. Thus, one of approaches to reduce the noise are isolating the individual grains and/or refining the grain sizes as well as reducing the magnetic film thickness. An example of reducing the media noise is proposed by U.S. Pat. No. 5,516,547 issued to Shimizu et al.. The patent reported that admixing of $SiO_2$ to about 10% by volume in the CoPt Cr magnetic film can reduce media noise and increase the in-plane coercivity.

In U.S. Pat. No. 5,693,426, Lee et al., proposed to control grain growth by forming an extremely thin Cr intermediate layer (20–50 Å) between a Co-based magnetic alloy and an underlayer having B-2 structure. The characteristic of recording media structure Lee proposed includes that a Cr intermediate layer and Co-based magnetic film are formed sequentially and epitaxially on the B-2 structure. Lee observed it has properties of increase in coercivity and hysteresis loop squarensess.

Ohkijima et al., on the paper of IEEE, 5, p2944 (1997), titled "Effect of CoCr Interlayer on Longitudinal Recording" further proposed a CoCr interlayer structure for the recording media. They found that the media structure with a CoCr 37 interlayer between Co-alloy magnetic layer and the Cr underlayer has better performances in coercivities and S/N of media than without interlayer. Ohkijima et al., also investigated the structure of the media with and without a CoCr interlayer by using TEM cross-sectional view. Ohkijima found that the grain growth at the boundary between the Cr underlayer and CoCrTa magnetic layer is discrete. By contrast, the grain grows continuously between the boundary of CoCr interlayer and the CoCrTa magnetic layer. Thus Ohkijima concluded that the CoCr interlayer could improve the lattice matching at the boundary of the CoCrTa layer.

SUMMARY OF THE INVENTION

A magnetic recording medium using a nonmagnetic interlayer in between a Cr-base underlayer and a Co magnetic layer is disclosed. The nonmagnetic interlayer comprises $Co_{1-\alpha-\beta-\gamma-\zeta}Cr_\alpha X_\beta Y_\gamma Z_\zeta$. X is a material selected from Ni or Fe so as to substitute a portion of Cr composition. Y is a material selected from materials which can form a solid solution with at least one of list materials consisting of Ni, Fe, Co, and Cr. The Y material added in the interlayer is to adjust the lattice mismatch between the interlayer and the under layer to a magnitude so that the interlayer formed on the underlayer at least have a preferred orientation, an epitaxial layer is best preferred. The Y material can be chosen from elements such as V, Mo, Ru, Ti, and Mn. However, Z is a material which is insoluble with any of above list materials, Cr, Co, X, and Y in a solid state so as to form precipitates, thereby inhibiting the grain growth. The Z material can be selected one among B, Ta, Nb, Zr, W, oxides and nitrides. In a preferred embodiment, the $\alpha$, $\beta$, $\gamma$, and $\zeta$ are at a range of about 25–41%, 0.1–5%, 0.1–5%, and 0.1–5%, respectively. The interlayer thickness is of between about 0.5–20 nm.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
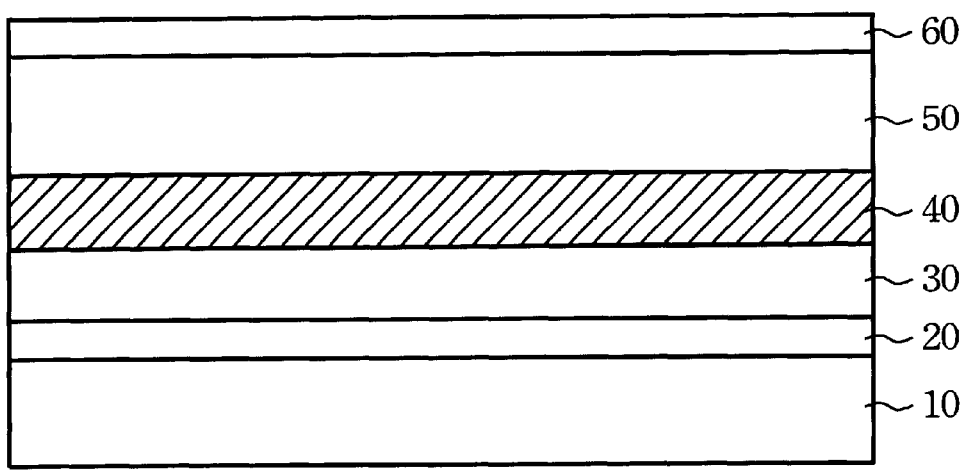
FIG. 1 shows the cross-sectional view of recording media according to the present invention.

Referring to FIG. 1, for coating longitudinal thin-film medium, a substrate 10 heated to about 200° C. is prepared. The Substrate 10 is an aluminum substrate plated with a selected alloy, such as nickel-phosphorus (NiP) which is generally used for digital recording media. It may also be a non-metal material, such as glass or ceramic. Then a first underlayer 20 and a second underlayer 30 are deposited sequentially. In a preferred embodiment, the first underlayer 20 has a thickness of about 1–50 nm, which may be capable of providing nucleating sites, but it is with random lattice plane orientation, and does not provide a desired lattice constant. The second underlayer 30 with a thickness of about 1–50 nm in thickness is formed to control the grain size and adjust its lattice constant to an apt value. Preferably, the first underlayer 20 is formed of a material selected from the group consisting of Cr, CrMo, CrV, CrRu, and CrW and second underlayer 20 is formed of a material selected from the group consisting of Cr, CrMo, CrV, CrRu, and CrW. The first underlayer 20 and the second underlayer 30 are different material but the lattice constant of the second underlayer 30 had to be close to an interlayer 40. For example, compositions of the first under layer 20 are Cr and the second under layer are $Cr_{0.8}Mo_{0.2}$ for the $Co_{0.58}Ni_{0.02}Cr_{0.38}Mo_{0.01}Ta_{0.01}$ interlayer film.

Still referring to FIG. 1 an interlayer 40 and magnetic layer 50 is sequentially deposited on the second underlayer 30. The interlayer is formed of $Co_{1-\alpha-\beta-\gamma-\zeta}Cr_\alpha X_\beta Y_\gamma Z_\zeta$ where X is a first material selected from ferromagnetic material, such as Ni or Fe. The Ni is known to have a lower magnetic moment than Co, but Fe has a higher one. Thus, the role of Ni in the interlayer 40 can substitute for less Co, but Fe is more. The Cr and Y composition are doped to accommodate the lattice mismatch of the interface between the interlayer itself and the Cr-based underlayer. The Y composition herein is not the element yttrium (Y) but represents a material, such as V, Mo, Ru, Ti, and Mn, being capable of forming a solid solution with either one of materials consisting of Ni, Fe, Co, and Cr.

By contrast, Z is a third material which is insoluble with any of list materials consisting of Cr, Co, X, and Y in the solid state. Thus the Z element added is to form precipitates at the grain boundary of the interlayer to inhibit the grain growth so as to approach the grain refining purpose. The typical materials of third materials Z are consisting of B, Ta, Nb, Zr, W, oxides and nitrides. The values of $\alpha$, $\beta$, $\gamma$, and $\zeta$ at a range of about 25–41%, 0.1–5%, 0.1–5%, and 0.1–5%, respectively, are preferred. The lattice mismatch is about 1–15% in accordance with the compositions of X, Y, Z. Preferably, the lattice mismatch between two layers is lower than 8%. Take $Cr_{0.8}Mo_{0.2}$, the second underlayer 30 and the $Co_{0.58}Ni_{0.02}Cr_{0.38}Mo_{0.01}Ta_{0.01}$, interlayer 40 as an example, the lattice mismatch between them is lower than 8%. As a consequence, a distorted HCP structure having lattice mismatch at the interface between the interlayer 40 and second underlayer is thus anticipated.

After interlayer 40 is deposited, a Co-alloy magnetic layer 50 and carbon overcoat layer 60 are deposited sequentially. The thickness of the magnetic layer 50 and carbon overcoat layer 60 are between about 1 nm to 30 nm and 1 nm to 10 nm, respectively.

Figure 2:
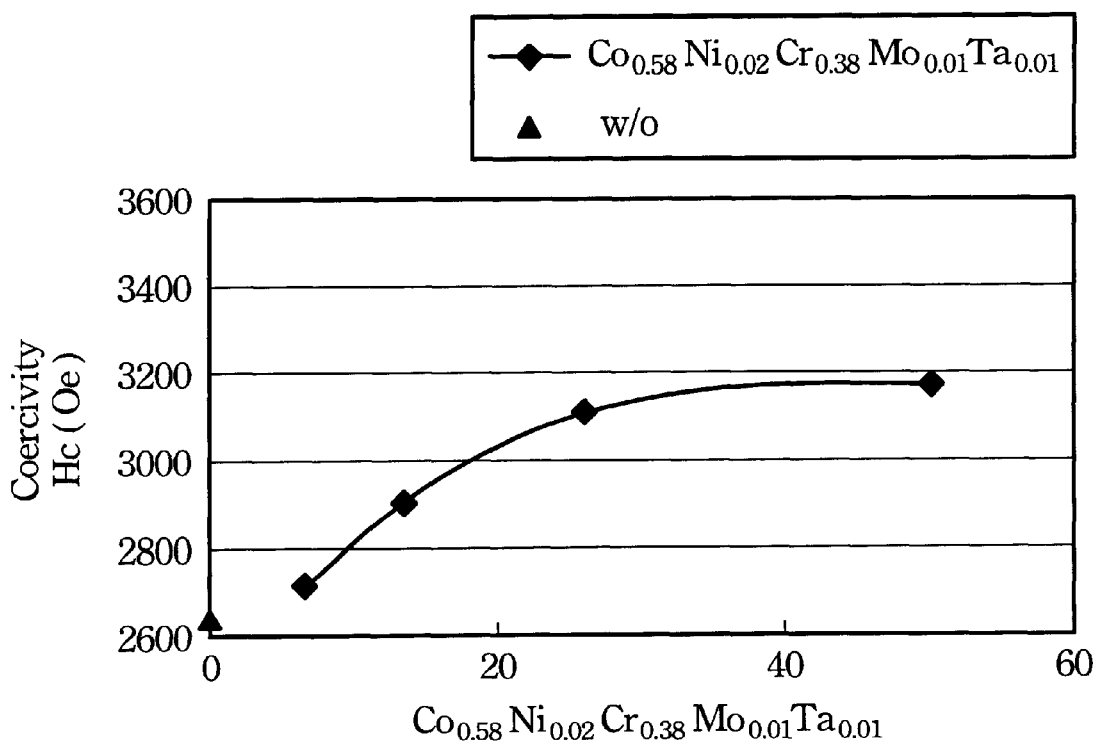
FIG. 2 shows the thickness effect of interlayer film with compositions $Co_{0.58}Ni_{0.02}Cr_{0.38}Mo_{0.01}Ta_{0.01}$ on coercivity.
Figure 3:
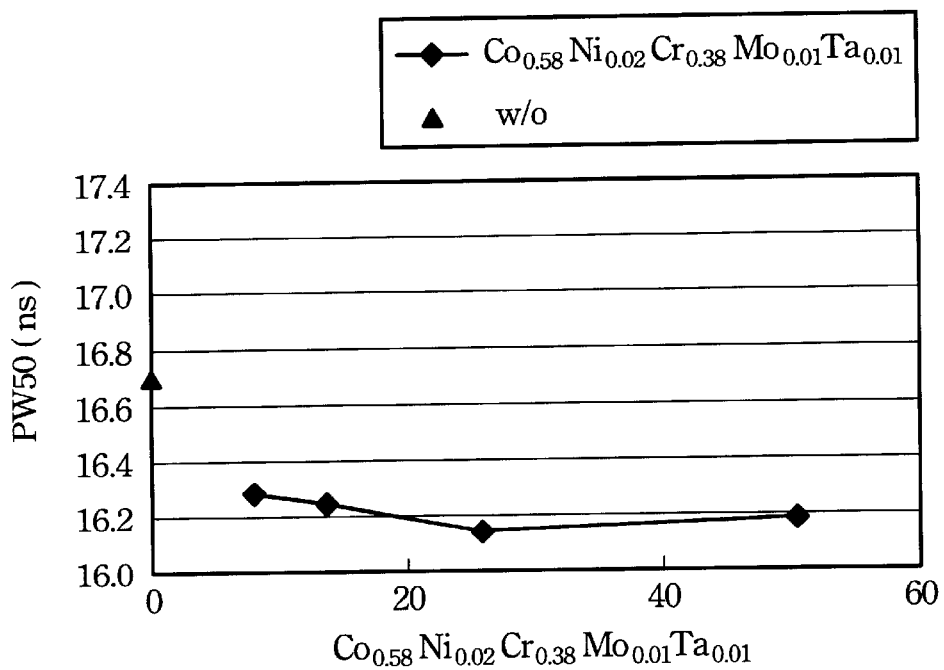
FIG. 3 shows the dependence of PW50 on the $Co_{0.58}Ni_{0.02}Cr_{0.38}Mo_{0.01}Ta_{0.01}$ interlayer film thickness according to the present invention.
Figure 4:
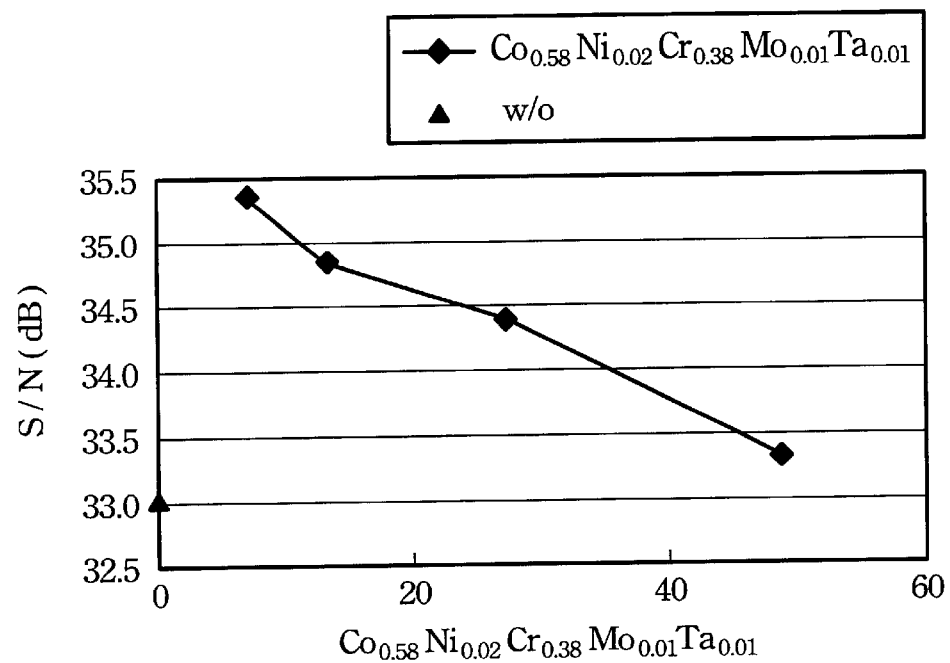
FIG. 4 shows the thickness effect of the interlayer film on signal noise ratio (S/N).

The magnetic properties of the recording media are measured by VSM and the recording properties are measured on a Guzik test stand with GMR head. The media noise measurements are carried out using a spectrum analyzer. FIG. 2 shows the thickness effect of interlayer film with compositions $Co_{0.58}Ni_{0.02}Cr_{0.38}Mo_{0.01}Ta_{0.01}$ on coercivity. The interlayer film significantly increases the coercivity value by over 300 Oe is investigated for film thickness larger than 20 Å. FIG. 3 shows the dependence of PW50 on the $Co_{0.58}Ni_{0.02}Cr_{0.38}Mo_{0.01}Ta_{0.01}$ interlayer film thickness. More than 5 Å in thickness of the interlayer film can availability reduce the PW50 value over 0.3 ns. FIG. 4 shows the thickness effect of the interlayer film on signal noise ratio (S/N). It is found the S/N is reduced with the interlayer film thickness increased.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A magnetic recording medium comprising:

a substrate;

a first underlayer formed on said substrate;

a second underlayer formed on said first underlayer;

a nonmagnetic interlayer formed of $Co_{1-\alpha-\beta-\gamma-\zeta}Cr_\alpha X_\beta Y_\gamma Z_\zeta$ on said second underlayer, said X being a first material selected one from Ni or Fe, said Y being a second material selected from the group consisting of V, Mo, Ru, Ti, and Mn, said Z being a third material selected from the group consisting of B, Ta, Nb, Zr, W, nitrides and oxides, said $\alpha$ being a value of 25–41%, said $\beta$ being a value of 0.1–5%, said $\gamma$ being a value of 0.1–5%, said $\zeta$ being a value of 0.1–5%, further, the summation of said $\alpha$, $\beta$, $\gamma$, and $\zeta$ being smaller than 43% thereby said nonmagnetic interlayer being coherently formed on said second underlayer; and a Co-based magnetic layer formed on said nonmagnetic interlayer.

2. The magnetic recording medium according to claim 1, wherein said second material added is to reduce the lattice mismatch of the interface between said nonmagnetic interlayer and said second underlayer down to a value lower than 8% so that said nonmagnetic interlayer has at least one crystallographic orientation texturally formed on said second underlayer.

3. The magnetic recording medium according to claim 1, wherein said first underlayer is formed of a material selected from the group consisting of Cr, CrMo, CrV, CrRu, and CrW.

4. The magnetic recording medium according to claim 1, wherein said second underlayer is formed of a material selected from the group consisting of Cr, CrMo, CrV, CrRu, and CrW.

5. The magnetic recording medium according to claim 1, wherein said nonmagnetic interlayer has a thickness of between 0.5–20 nm.

6. The magnetic recording medium according to claim 1, wherein said nonmagnetic interlayer having a lattice mismatch lower than 10% at the interface between said nonmagnetic interlayer and said second underlayer.

7. The magnetic recording medium according to claim 6, wherein said third material is for forming precipitates at grain boundaries of said nonmagnetic interlayer so as to refine grain sizes of said interlayer.

8. The magnetic recording medium according to claim 6, wherein said third material is for forming precipitates at grain boundaries of said nonmagnetic interlayer so as to refine grain sizes of Co-based magnetic layer.

9. A magnetic recording medium comprising:

a substrate;

a Cr-base layer formed on said substrate;

a nonmagnetic interlayer formed of $Co_{1-\alpha-\beta-\gamma-\zeta}Cr_\alpha Ni_\beta Mo_\gamma Ta_\zeta$ on said Cr-base layer and having a distorted HCP structure with a lattice mismatch lower than 10% at the interface between said nonmagnetic interlayer and said Cr-base layer, said $\alpha$ being a value of 25–41%, said $\beta$ being a value of 0.1–5%, said $\gamma$ being a value of 0.1–5%, said $\zeta$ being a value of 0.1–5%; and a Co-based magnetic layer formed on said nonmagnetic interlayer.

10. The magnetic recording medium according to claim 9, wherein said Cr-base layer is formed of a material selected from the group consisting of Cr, CrMo, CrV, CrRu, and CrW.

11. The magnetic recording medium according to claim 9, wherein said nonmagnetic interlayer has a thickness of between 0.5–20 nm.

12. A magnetic recording medium comprising:

a substrate;

a first underlayer formed on said substrate;

a second underlayer formed on said first underlayer;

a nonmagnetic interlayer formed of $Co_{1-\alpha-\beta-\gamma-\zeta}Cr_\alpha X_\beta Y_\gamma Z_\zeta$ on said second underlayer, said X being a first material selected one from Ni or Fe, said Y being a second material selected from the group consisting of Ru, Ti, and Mn, said Z being a third material selected from the group consisting of B, Ta, Nb, Zr, W, nitrides and oxides, said a being a value of 25–41%, said $\beta$ being a value of 0.1–5%, said $\gamma$ being a value of 0.1–5%, said $\zeta$ being a value of 0.1–5%, further, the summation of said $\alpha$, $\beta$, $\gamma$, and $\zeta$ being smaller than 43% thereby said nonmagnetic interlayer being coherently formed on said second underlayer; and a Co-based magnetic layer formed on said nonmagnetic interlayer.

* * * * *

UNITED STATES PATENT AND TRADEMARK OFFICE
CERTIFICATE OF CORRECTION

PATENT NO. : 6,479,169 B1
DATED : November 12, 2002
INVENTOR(S) : Chang et al.

It is certified that error appears in the above-identified patent and that said Letters Patent is hereby corrected as shown below:

Column 5,
Line 5, (1st occurrence) "a" should read -- α --

Signed and Sealed this

Second Day of March, 2004

JON W. DUDAS
*Acting Director of the United States Patent and Trademark Office*